(12) United States Patent
Kim et al.

(10) Patent No.: US 10,693,326 B2
(45) Date of Patent: Jun. 23, 2020

(54) WIRELESS POWER RECEIVING APPARATUS CONTROLLING EFFECTIVE LOAD RESISTANCE, AND EFFECTIVE LOAD RESISTANCE CONTROL METHOD

(71) Applicant: Electronics and Telecommunications Research Institute, Daejeon (KR)

(72) Inventors: Seong-Min Kim, Daejeon (KR); Sang-Won Kim, Daejeon (KR); Jung Ick Moon, Daejeon (KR); In Kui Cho, Daejeon (KR); Je Hoon Yun, Daejeon (KR); Dong Won Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 109 days.

(21) Appl. No.: 15/986,429

(22) Filed: May 22, 2018

(65) Prior Publication Data
US 2019/0036379 A1 Jan. 31, 2019

(30) Foreign Application Priority Data

Jul. 27, 2017 (KR) .................. 10-2017-0095484
Oct. 16, 2017 (KR) .................. 10-2017-0133795

(51) Int. Cl.
*H02J 50/12* (2016.01)

(52) U.S. Cl.
CPC .................. *H02J 50/12* (2016.02)

(58) Field of Classification Search
None
See application file for complete search history.

(56) References Cited

U.S. PATENT DOCUMENTS

| 2012/0153739 A1* | 6/2012 | Cooper | H02J 5/005 307/104 |
| 2015/0349538 A1* | 12/2015 | Agostinelli | H02J 50/12 307/104 |
| 2016/0156200 A1 | 6/2016 | Kim et al. | |
| 2016/0254679 A1* | 9/2016 | Liu | H02J 7/025 307/104 |
| 2016/0254691 A1 | 9/2016 | Koo et al. | |

(Continued)

FOREIGN PATENT DOCUMENTS

| KR | 101390954 B1 | 4/2014 |
| KR | 101617346 B1 | 5/2016 |
| KR | 101743071 B1 | 6/2017 |

OTHER PUBLICATIONS

W. X. Zhong et al., IEEE Transactions on Power Electronics, "Maximum Energy Efficiency Tracking for Wireless Power Transfer Systems", Aug. 28, 2014, pp. 4025-4034, vol. 30, No. 7, Jul. 2015, IEEE.

*Primary Examiner* — Jared Fureman
*Assistant Examiner* — Joel Barnett
(74) *Attorney, Agent, or Firm* — William Park & Associates Ltd.

(57) ABSTRACT

Disclosed is a wireless power receiving apparatus capable of controlling an effective load resistance. The wireless power receiving apparatus may include a rectifier configured to generate a rectified voltage based on a magnetic field generated in a wireless power transmitting apparatus, and a controller configured to transmit, to the rectifier, a control signal for controlling a rectified phase of the rectifier to adjust an effective load resistance of the wireless power receiving apparatus.

10 Claims, 3 Drawing Sheets

(56) References Cited

U.S. PATENT DOCUMENTS

| | | |
|---|---|---|
| 2017/0149285 A1 | 5/2017 | Ushijima et al. |
| 2017/0237302 A1* | 8/2017 | Sorge .................. H04B 5/0037 307/104 |
| 2017/0353053 A1* | 12/2017 | Muratov ................ H02J 50/12 |

* cited by examiner

WIRELESS POWER RECEIVING APPARATUS CONTROLLING EFFECTIVE LOAD RESISTANCE, AND EFFECTIVE LOAD RESISTANCE CONTROL METHOD

CROSS-REFERENCE TO RELATED APPLICATION(S)

This application claims the priority benefit of Korean Patent Application No, 10-2017-0095484 filed on Jul. 27, 2017, and Korean Patent Application No. 10-2017-0133795 filed on Oct. 16, 2017, in the Korean Intellectual Property Office, the disclosures of which are incorporated herein by reference for all purposes.

BACKGROUND

1. Field

One or more example embodiments relate to wireless power transfer, and more particularly, to a method of maximizing a wireless power transfer efficiency without communication between a wireless power transmitting apparatus and a wireless power receiving apparatus.

2. Description of Related Art

The propagation of smart devices has contributed to a growing consumption of electric power, and thus to a growing supply of power to devices in various spaces, for example, offices, cafes, and the like. Thus, various wireless power supply methods have been introduced to resolve inconvenience experienced in using an existing wired power supply method.

To wirelessly supply power, there has been a method of controlling a characteristic of a direct current (DC)-to-DC (DC/DC) converter of a wireless power receiving apparatus and maintaining a maximum wireless power supply or transfer efficiency. However, such an existing method may require that an optimal efficiency needs to be obtained within an operating range of the DC/DC converter and the DC/DC converter needs to maintain a stable operation although the characteristic of the DC/DC converter is controlled. There has also been a method of obtaining power needed for a wireless power receiving apparatus through communication between a wireless power transmitting apparatus and the wireless power receiving apparatus and controlling transmission power by the wireless power transmitting apparatus. However, such an existing method may require an additional communication device for the communication between the wireless power transmitting apparatus and the wireless power receiving apparatus.

Thus, there is a desire for a method to maintain a maximum wireless power transfer efficiency irrespective of a change in load, and for a wireless power receiving apparatus for wireless power transfer that does not require communication between a wireless power transmitting apparatus and the wireless power receiving apparatus.

SUMMARY

An aspect provides a method of controlling an effective load resistance of a wireless power receiving apparatus using a controller included in the wireless power receiving apparatus and maintaining an optimal wireless power transfer efficiency, despite a limited inductance of a resonator, a limited transfer distance, and a changing load, in order to wirelessly transfer power.

According to an example embodiment, there is provided a wireless power receiving apparatus including a rectifier configured to generate a rectified voltage based on a magnetic field generated in a wireless power transmitting apparatus, and a controller configured to transmit, to the rectifier, a control signal for controlling a rectified phase of the rectifier to adjust an effective load resistance of the wireless power receiving apparatus.

The controller may identify a load voltage to be applied to a load of the wireless power receiving apparatus and a load current flowing in the load, and identify the effective load resistance based on the load voltage and the load current.

The controller may also identify an optimal effective load resistance that allows the wireless power receiving apparatus to have a maximum efficiency, determine an optimal rectified phase at which the effective load resistance is equal to the optimal effective load resistance, and transmit, to the rectifier, the control signal for controlling the rectified phase to be the optimal rectified phase.

The optimal effective load resistance may be determined based on a parasitic resistance of the wireless power transmitting apparatus, an inductance of a transmission resonator included in the wireless power transmitting apparatus, a parasitic resistance of the wireless power receiving apparatus, an inductance of a reception resonator included in the wireless power receiving apparatus, and a coupling coefficient between the transmission resonator and the reception resonator.

The controller may also determine an optimal rectified voltage at which the effective load resistance is equal to the optimal effective load resistance, and determine the optimal rectified phase that allows the rectifier to output the optimal rectified voltage.

According to another example embodiment, there is provided a method of controlling an effective load resistance, hereinafter simply referred to as an effective load resistance control method, the method including identifying a rectified voltage generated in a rectifier using a magnetic field received by a wireless power receiving apparatus from a wireless power transmitting apparatus, identifying an effective load resistance of the wireless power receiving apparatus, and transmitting, to the rectifier, a control signal for controlling a rectified phase of the rectifier to adjust the effective load resistance.

The identifying of the effective load resistance may include identifying a load voltage to be applied to a load of the wireless power receiving apparatus and a load current flowing in the load, and identifying the effective load resistance to be applied to the wireless power receiving apparatus based on the load voltage the load current.

The transmitting of the control signal to the rectifier may include identifying an optimal effective load resistance that allows the wireless power receiving apparatus to have a maximum efficiency, determining an optimal rectified phase at which the effective load resistance is equal to the optimal effective load resistance, and transmitting, to the rectifier, the control signal for controlling the rectified phase to be the optimal rectified phase.

The optimal effective load resistance may be determined based on a parasitic resistance of the wireless power transmitting apparatus, an inductance of a transmission resonator included in the wireless power transmitting apparatus, a parasitic resistance of the wireless power receiving apparatus, an inductance of a reception resonator included in the wireless power receiving apparatus, and a coupling coefficient between the transmission resonator and the reception resonator.

The determining of the optimal rectified phase may include determining an optimal rectified voltage at which the effective load resistance is equal to the optimal effective load resistance, and determining the optimal rectified phase that allows the rectifier to output the optimal rectified voltage.

According to example embodiments described herein, by controlling an effective load resistance of a wireless power receiving apparatus using a controller included in the wireless power receiving apparatus, it is possible to maintain an optimal wireless power transfer efficiency to wirelessly transfer power, despite a limited inductance of a resonator, a limited transfer distance, and a changing load.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
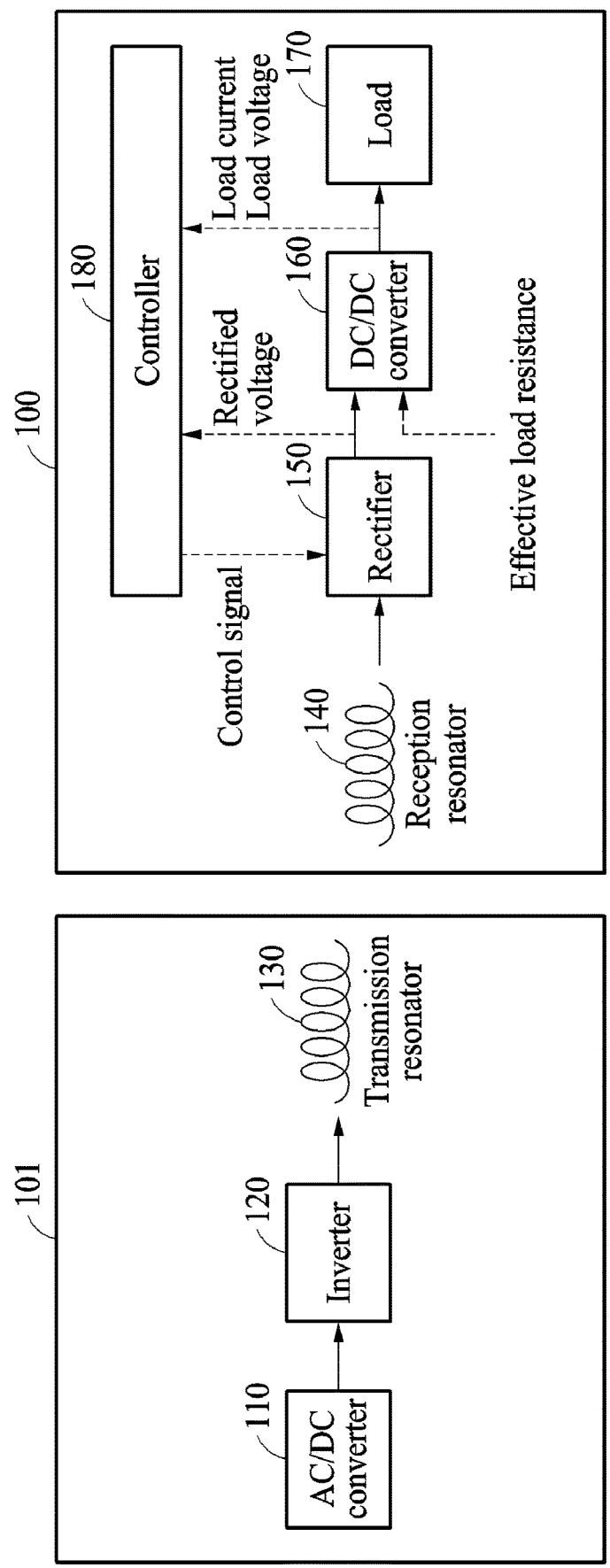
FIG. 1 is a diagram illustrating an example of a wireless power transmitting apparatus and a wireless power receiving apparatus according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a wireless power transmitting apparatus and a wireless power receiving apparatus according to an example embodiment.

Referring to FIG. 1, a wireless power transmitting apparatus 101 includes an alternating current (AC)-to-direct current (DC) (AC/DC) converter 110, an inverter 120, and a transmission resonator 130. The AC/DC converter 110 may receive an AC signal and convert the received AC signal to a DC signal. The inverter 120 may receive the DC signal obtained through the conversion performed by the AC/DC converter 110, and generate a radio frequency (RF) signal for wireless power transfer using the received DC signal. The transmission resonator 130 may generate a magnetic field using the RF signal generated by the inverter 120.

A wireless power receiving apparatus 100 includes a reception resonator 140, a rectifier 150, a DC-to-DC (DC/DC) converter 160, a load 170, and a controller 180.

The reception resonator 140 may generate an AC signal using the magnetic field generated in the transmission resonator 130 of the wireless power transmitting apparatus 101, and transmit the generated AC signal to the rectifier 150.

The rectifier 150 may rectify the AC signal received from the reception resonator 140 to be a DC signal using a silicon-controlled rectifier (SCR). Herein, the rectifier 150 may delay a phase of an SCR voltage to control a point in time at which a gate operation is turned on and adjust a magnitude of a rectified voltage. The phase of an SCR voltage used herein may also be referred to as a rectified phase.

The DC/DC converter 160 may convert the rectified DC signal to a DC level required by the load 170, and the load 170 may then consume wirelessly received power.

The controller 180 may detect the DC signal rectified by the rectifier 150, which is a rectified voltage, a load voltage to be applied to the load 170, and a load current flowing in the load 170. In addition, the controller 180 may identify the load 170 based on the detected load voltage and the detected load current and transmit, to the rectifier ISO, a control signal that allows an effective load resistance of the wireless power receiving apparatus 100 affected by the load 170 to be an optimal effective load resistance. Herein, the optimal effective load resistance may be an effective load resistance at which a maximum efficiency in wireless power transfer, or a maximum wireless power transfer efficiency, may be obtained, and the effective load resistance may be controlled by adjusting the rectified voltage.

Figure 2:
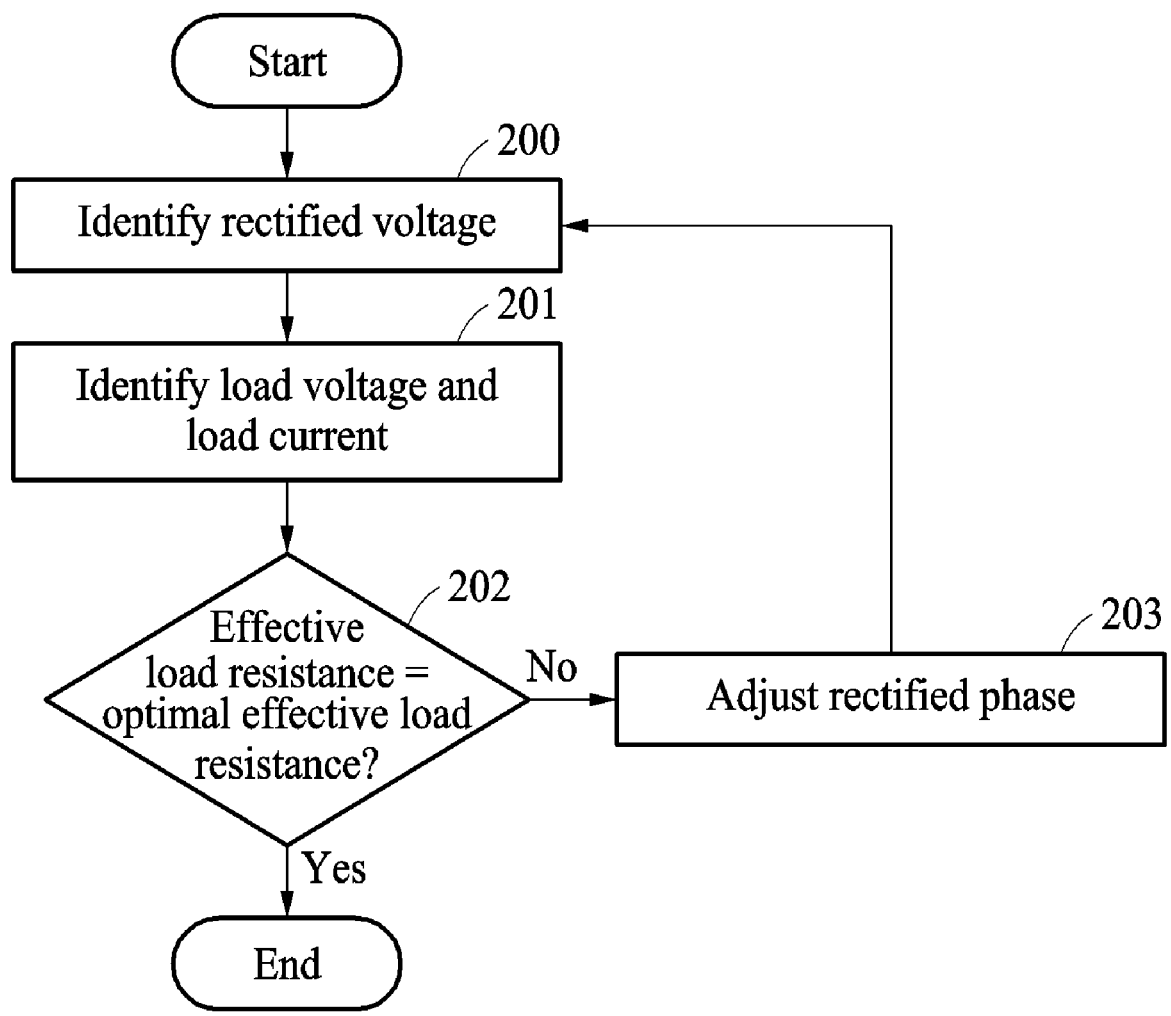
FIG. 2 is a flowchart illustrating an example of an effective load resistance control method according to an example embodiment.

FIG. 2 is a flowchart illustrating an example of a method of controlling an effective load resistance according to an example embodiment. The method of controlling an effective load resistance may also be referred to herein as an effective load resistance control method.

Referring to FIG. 2, in operation 200, the controller 180 identifies a DC signal generated by the rectifier 150.

In detail, the controller 180 may detect a magnitude and a phase of a rectified voltage generated by the rectifier 150. The rectified voltage detected by the controller 180 may be determined at a point in time at which a gate operation of an SCR of the rectifier 150 is turned on. That is, the rectifier 150 receiving an AC signs generated by the reception resonator 140 may generate a DC signal by rectifying the received AC signal. Herein, when generating the DC signal using the SCR of the rectifier 150, by adjusting a phase of an SCR voltage and controlling the point in time at which the gate operation is turned on, it is possible to control the magnitude of the rectified voltage.

In operation 201, the controller 180 identifies a load voltage to be applied to the load 170 and a load current flowing in the load 170. In addition, the controller 180 determines a value of the load 170 based on the identified load voltage and the identified load current. In addition, the controller 180 identifies an effective load resistance of the wireless power receiving apparatus 100 based on the determined value of the load 170.

In operation 202, the controller 180 determines whether the effective load resistance is equal to an optimal effective load resistance needed for an optimal efficiency in wireless power transfer, or simply an optimal wireless power transfer efficiency.

In detail, the controller 180 may determine a wireless power transfer efficiency based on a wireless power transfer frequency, an inductance and a parasitic resistance of the wireless power transmitting apparatus 101, and an inductance, a parasitic resistance, and an effective load resistance of the wireless power receiving apparatus 100, and a coupling coefficient between the transmission resonator 130 and the reception resonator 140. Herein, the controller 180 may determine, to be the optimal effective load resistance, an effective load resistance at which the wireless power transfer efficiency becomes at its maximum. The controller 180 may also determine whether the effective load resistance of the wireless power receiving apparatus 100 is equal to the optimal effective load resistance.

In operation 203, the controller 180 adjusts a rectified phase of the rectifier 150.

In detail, the effective load resistance of the wireless power receiving apparatus 100 may be determined by a load resistance and the point in time at which the gate operation of the SCR is turned on. Herein, the point in time at which the gate operation is turned on may be determined by the rectified phase. The controller 180 may determine an optimal rectified voltage at which the wireless power receiving apparatus 100 has the optimal effective load resistance, and an optimal rectified phase needed to output the optimal rectified voltage. In addition, the controller 180 may determine whether the rectified voltage identified in operation 200 is the optimal rectified voltage. Herein, in response to the rectified voltage being greater or less than the optimal rectified voltage, the controller 180 may transmit, to the rectifier 150, a control signal to adjust the rectified phase of the rectifier 150 to the optimal rectified phase to adjust a magnitude of the rectified voltage. The rectifier 150 may adjust the rectified phase based on the control signal received from the controller 180.

Figure 3:
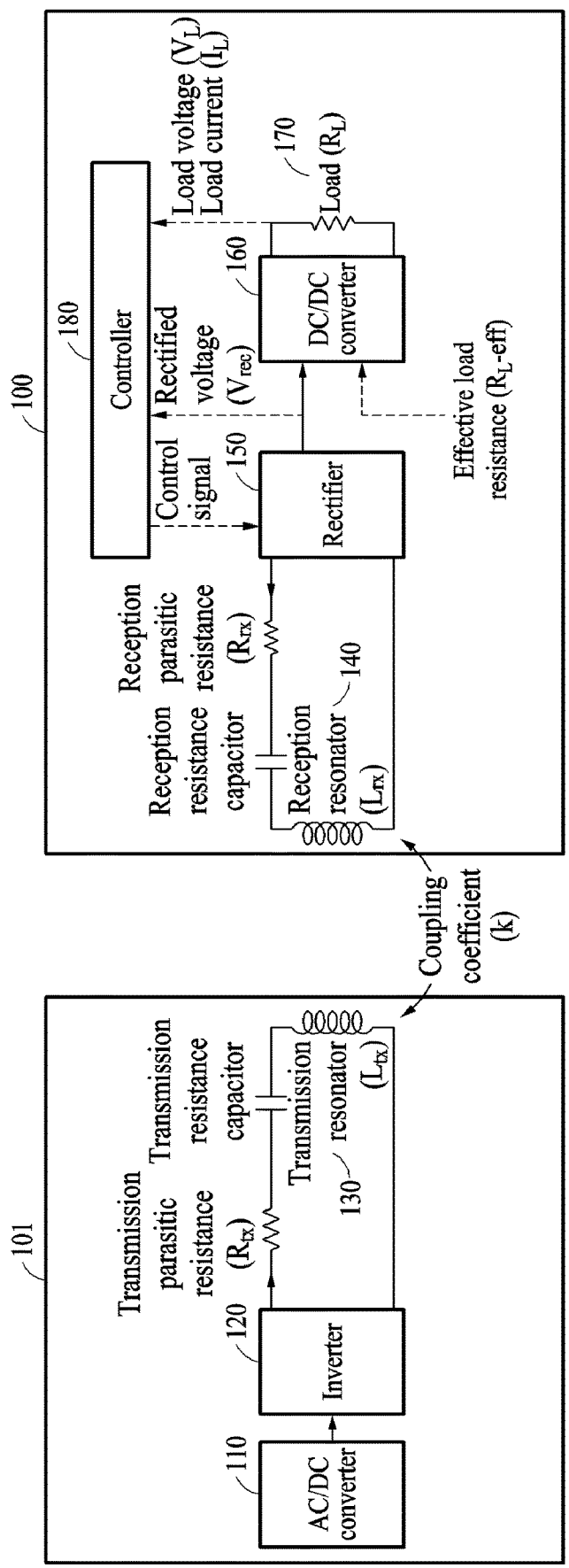
FIG. 3 is a diagram illustrating a detailed example of a wireless power transmitting apparatus and a wireless power receiving apparatus according to an example embodiment.

FIG. 3 is a diagram illustrating a detailed example of the wireless power transmitting apparatus 101 and the wireless power receiving apparatus 100 of FIG. 1.

Referring to FIG. 3, a transmission parasitic resistance indicating all parasitic resistance components in the wireless power transmitting apparatus 101 is indicated as $R_{tx}$, an inductance of the transmission resonator 130 is indicated as $L_{tx}$, a reception parasitic resistance indicating all parasitic resistance components in the wireless power receiving apparatus 100 is indicated as $R_{rx}$, an inductance of the reception resonator 140 is indicated as $L_{rx}$, and a coupling coefficient between the transmission resonator 130 and the reception resonator 140 is indicated as k.

In general, a size of a transmission resonator and a size a reception resonator, and a transfer distance may be determined or limited based on a magnitude of a load, power consumption, and the like, and thus an inductance of the transmission resonator and an inductance of the reception resonator may also be determined or limited accordingly.

For example, when a buck DC/DC converter is used as a DC/DC converter, a wireless power transfer efficiency η may be determined based on Equation 1 under the condition of a limited inductance and a limited transfer distance.

$$\eta = \frac{(2\pi f_t)^2 \cdot k^2 L_{tx} L_{rx} \cdot R_{L\_eff}}{R_{tx} \cdot (R_{rx} + R_{L\_eff})^2 + k^2 L_{tx} L_{rx} \cdot (R_{tx} + R_{L\_eff})} \quad \text{[Equation 1]}$$

In Equation 1, $f_t$ denotes a wireless power transfer frequency.

For example, as illustrated, the controller 180 determines an optimal effective load resistance $R_{L\_eff\_opt}$ at which the wireless power transfer efficiency η has a maximum value as represented by Equation 2 based on the transmission parasitic resistance $R_{tx}$ of the wireless power transmitting apparatus 101, the inductance $L_{tx}$ of the transmission resonator 130, the reception parasitic resistance $R_{rx}$ of the wireless power receiving apparatus 100, the inductance $L_{rx}$ of the reception resonator 140, and the coupling coefficient k between the transmission resonator 130 and the reception resonator 110.

$$R_{L\_eff\_opt} = R_{rx} \cdot \sqrt{\left(1 + \frac{(2\pi f_t)^2 \cdot k^2 L_{tx} L_{rx}}{R_{tx} R_{rx}}\right)} \quad \text{[Equation 2]}$$

An effective load resistance $R_{L\_eff}$ of the wireless power receiving apparatus 100 may be an equivalent resistance including a resistance of the DC/DC converter 160 and a resistance $R_L$ of the load 170 that actually consumes power. Here, the effective load resistance $R_{L\_eff}$ may indicate a transfer characteristic that varies depending on a type of DC/DC converter.

The effective load resistance $R_{L\_eff}$ may have a relationship with the resistance $R_L$ of the load 170 as represented by Equation 3.

$$R_{L\_eff} = \left(\frac{1}{D}\right)^2 \cdot R_L \quad \text{[Equation 3]}$$

In Equation 3, D denotes an interval in which a switch of the DC/DC converter 160 is turned on, and has a value being between 0 and 1.

In addition, a rectified voltage $V_{rec}$ and a load voltage $V_L$ may have a relationship represented by Equation 4 based on the relationship represented by Equation 3 above.

$$V_{rec} = \left(\frac{1}{D}\right) \cdot V_L \quad \text{[Equation 4]}$$

The controller 180 may transmit, to the rectifier 150, a control signal that satisfies Equation 5 to obtain a maximum wireless power transfer efficiency in a given circumstance although the load 170 is changed and the load resistance $R_L$ is also changed.

$$R_{L\_eff\_opt} = R_{L\_eff} = \left(\frac{1}{D}\right)^2 \cdot R_L \quad \text{[Equation 5]}$$

That is, the controller 180 may transmit, to the rectifier 150, the control signal to control the rectified voltage $V_{rec}$ input to the DC/DC converter 160 such that the wireless power receiving apparatus 100 has a maximum wireless power transfer efficiency. In addition, the rectifier 150 may adjust a voltage ratio between the rectified voltage $V_{rec}$ and the load voltage $V_L$ by adjusting the rectified phase based on the received control signal, and thus may control the effective load resistance $R_{L\_eff}$ to be equal to the optimal effective load resistance $R_{L\_eff\_opt}$.

The controller 180 may detect the load voltage $V_L$ and the load current $I_L$ of the wireless power receiving apparatus 100 on a periodic basis, and measure the load 170 based on the detected load voltage $V_L$ and the detected load current $I_L$ on a periodic basis. The controller 180 may also transmit, to the rectifier 150, the control signal such that the identified effective load resistance becomes the optimal effective load resistance that is set in advance based on a wireless transfer environment, using the measured load 170. In addition, the rectifier 150 may control the rectified voltage $V_{rec}$ by adjusting the rectified phase based on the received control signal.

By repeating the operations, stages, or processes described above based on a preset period, it is possible to maintain an optimal effective load resistance of the wireless power receiving apparatus 100, and thus maintain a maximum wireless power transfer efficiency of the wireless power receiving apparatus 100, despite a change in load.

The equations described herein are provided merely as examples when using a buck DC/DC converter, and thus they may change based on a type of converter to be used. The operations, stages, or processes described herein may be applied to maintain a maximum wireless power transfer, irrespective of a type of DC/DC converter.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power receiving apparatus comprising:
    a rectifier configured to generate a rectified voltage based on a magnetic field generated in a wireless power transmitting apparatus; and
    a controller configured to transmit, to the rectifier, a control signal for controlling a rectified phase of the rectifier to adjust an effective load resistance of the wireless power receiving apparatus,
    wherein the effective load resistance of the wireless power receiving apparatus is determined based on a load resistance and a point in time at which a gate operation of the rectifier is turned on,
    wherein the controller detects a magnitude and a phase of the rectified voltage generated by the rectifier,
    wherein the rectifier adjusts a phase of a voltage for the rectifier and controls the point in time at which the gate operation is turned on.

2. The wireless power receiving apparatus of claim 1, wherein the controller is configured to:
    identify a load voltage to be applied to a load of the wireless power receiving apparatus and a load current flowing in the load; and
    identify the effective load resistance based on the load voltage and the load current.

3. The wireless power receiving apparatus of claim 1, wherein the controller is configured to:
    identify an optimal effective load resistance that allows the wireless power receiving apparatus to have a maximum efficiency;
    determine an optimal rectified phase at which the effective load resistance is equal to the optimal effective load resistance; and
    transmit, to the rectifier, the control signal for controlling the rectified phase to be the optimal rectified phase.

4. The wireless power receiving apparatus of claim 3, wherein the optimal effective load resistance is determined based on a parasitic resistance of the wireless power transmitting apparatus, an inductance of a transmission resonator included in the wireless power transmitting apparatus, a parasitic resistance of the wireless power receiving apparatus, an inductance of a reception resonator included in the wireless power receiving apparatus, and a coupling coefficient between the transmission resonator and the reception resonator.

5. The wireless power receiving apparatus of claim 3, wherein the controller is configured to:
    determine an optimal rectified voltage at which the effective load resistance is equal to the optimal effective load resistance; and
    determine the optimal rectified phase that allows the rectifier to output the optimal rectified voltage.

6. A method of controlling an effective load resistance, the method comprising:
    identifying a rectified voltage generated in a rectifier using a magnetic field received by a wireless power receiving apparatus from a wireless power transmitting apparatus;
    identifying an effective load resistance of the wireless power receiving apparatus; and
    transmitting, to the rectifier, a control signal for controlling a rectified phase of the rectifier to adjust the effective load resistance,
    wherein the effective load resistance of the wireless power receiving apparatus is determined based on a load resistance and a point in time at which a gate operation of the rectifier is turned on,
    wherein the controller detects a magnitude and a phase of the rectified voltage generated by the rectifier,
    wherein the rectifier adjusts a phase of a voltage for the rectifier and controls the point in time at which the gate operation is turned on.

7. The method of claim 6, wherein the identifying of the effective load resistance comprises:
    identifying a load voltage to be applied to a load of the wireless power receiving apparatus and a load current flowing in the load; and
    identifying the effective load resistance to be applied to the wireless power receiving apparatus based on the load voltage and the load current.

8. The method of claim 6, wherein the transmitting of the control signal to the rectifier comprises:
    identifying an optimal effective load resistance that allows the wireless power receiving apparatus to have a maximum efficiency;
    determining an optimal rectified phase at which the effective load resistance is equal to the optimal effective load resistance; and
    transmitting, to the rectifier, the control signal for controlling the rectified phase to be the optimal rectified phase.

9. The method of claim 8, wherein the optimal effective load resistance is determined based on a parasitic resistance of the wireless power transmitting apparatus, an inductance of a transmission resonator included in the wireless power transmitting apparatus, a parasitic resistance of the wireless power receiving apparatus, an inductance of a reception resonator included in the wireless power receiving apparatus, and a coupling coefficient between the transmission resonator and the reception resonator.

10. The method of claim 8, wherein the determining of the optimal rectified phase comprises:
    determining an optimal rectified voltage at which the effective load resistance is equal to the optimal effective load resistance; and
    determining the optimal rectified phase that allows the rectifier to output the optimal rectified voltage.

* * * * *